(12) United States Patent
Takahashi et al.

(10) Patent No.: US 8,418,572 B2
(45) Date of Patent: Apr. 16, 2013

(54) THREE-DIMENSIONAL CAM MECHANISM (75) Inventors: Takayuki Takahashi, Sendai (JP); Seong Hee Jeong, Higashimatsuyama (JP); Yoshihito Ozawa, Fukushima (JP); Kunio Shimada, Fukushima (JP); Yaoyang Zheng, Iwaki (JP); Kazuhiko Fukuda, Fukushima (JP)

(73) Assignee: National University Corporation Fukushima University, Fukushima (JP)

( * ) Notice: Subject to any disclaimer, the term of this patent is extended or adjusted under 35 U.S.C. 154(b) by 421 days.

(21) Appl. No.: 12/451,712

(22) PCT Filed: May 28, 2008

(86) PCT No.: PCT/JP2008/060253
§ 371 (c)(1), (2), (4) Date: Nov. 25, 2009

(87) PCT Pub. No.: WO2008/149878
PCT Pub. Date: Dec. 11, 2008

(65) Prior Publication Data
US 2010/0116072 A1 May 13, 2010

(30) Foreign Application Priority Data
May 31, 2007 (JP) .................. 2007-144504

(51) Int. Cl.
*F16H 25/00* (2006.01)
(52) U.S. Cl.
USPC ........................... 74/89; 74/54; 74/567
(58) Field of Classification Search ............. 74/54, 89, 74/567
See application file for complete search history.

(56) References Cited

U.S. PATENT DOCUMENTS

| 1,980,527 A | 11/1934 | Newton | |
| 3,344,685 A * | 10/1967 | Crouzet | 74/569 |

(Continued)

FOREIGN PATENT DOCUMENTS

| JP | 58-31461 | 3/1983 |
| JP | 07-003576 A | 1/1995 |

(Continued)

OTHER PUBLICATIONS

Supplementary European Search Report dated Apr. 1, 2011, issued for European patent application No. 08765066.9.

(Continued)

*Primary Examiner* — William C Joyce
(74) *Attorney, Agent, or Firm* — Edwards Wildman Palmer LLP; James E. Armstrong, IV; George N. Chaclas (57) ABSTRACT

A three-dimensional cam mechanism capable of selecting a cam guide surface shape freely to improve the degree of freedom for selecting a target locus on the follower side, transmitting power between orthogonal axes and performing a reversible operation. A three-dimensional cam guide surface (2 (3)) is formed in a cam (1), and the cam guide surface (2) is caused to guide a cam follower (6 (7)) formed at a predetermined angle at one end of a follower side link (4), so that the rotational movement of the cam (1) is translated into the swinging movement at the other end of the follower side link (4). Thus, smooth operations of the cam are obtained by the selection of the shape of a supporting member and by the free design of the cam guide surface shape, without being limited to the power transmission between the orthogonal axes or followed by backlash.

15 Claims, 4 Drawing Sheets

U.S. PATENT DOCUMENTS 5,351,723 A    10/1994  Reudi
6,564,668 B1    5/2003  Bajo

FOREIGN PATENT DOCUMENTS

| | | |
|---|---|---|
| JP | 2002-529265 | 9/2002 |
| JP | 2004-346959 A | 12/2004 |

OTHER PUBLICATIONS

International Search Report mailed Aug. 12, 2008, issued on PCT/JP2008/060253.

\* cited by examiner

Prior Art

Fig. 5

THREE-DIMENSIONAL CAM MECHANISM

TECHNICAL FIELD

The present invention relates to a three-dimensional cam mechanism, which is configured such that a follower side link pivotally supported to a portion of a supporting member is guided along a cam guide surface of a three-dimensional cam pivotally supported to the supporting member to be rotatable about a predetermined rotation axis. The present invention can be applied to, for example, an endoscope, a machine tool, a robot articulation, and other products. However, in addition to such technical fields, the present invention can also be applied to a wide range of technical fields that require a reversible operation of a three-dimensional cam where a follower side is a driving joint.

BACKGROUND ART

In an articulating mechanism, such as a finger of a robot, lightweight and non-backlash characteristics have conventionally been required in order to improve the safety and obtain highly accurate control characteristics. Furthermore, in order to realize a high cost performance, it is desired that the structure of the articulating mechanism be simple and various target articular movements be performed in a wide articular movable range. In addition, the articulating mechanism needs to have a structure with no reverse drive performance, depending on the use application of a joint. Although a gear type articulating mechanism or a wire type articulating mechanism has conventionally been used more frequently to transmit a power in an arm, a finger, or other joint of a robot, it is a fact that these types of articulating mechanisms cannot fulfill most of the above-described characteristics at the same time. Especially when an operation of a follower side where a rotation axis of an actuator forms a predetermined angle is realized in the rotation axis, it is difficult to process the gear and to reduce backlash and the weight in the gear type articulating mechanism. The problems in the wire type articulating mechanism, on the other hand, are the increase in the number of parts to be used, such as a tension adjusting mechanism and a wire turning mechanism, as well as the lowering of the control characteristics due to stretching and interference of the wire. Moreover, realizing a more complicated follower joint movement by using these transmission mechanisms further complicates the structures and increases the weight thereof, and as a result non-reverse drive performance cannot be achieved, unless a worm gear or the like is used. For these reasons, smooth transmission of a power to the follower side by using a three-dimensional cam between a driving side and the follower side has been proposed. Patent Documents 1 and 2 described below should be referred to.

Patent Document 1: Japanese Patent Application Publication No. H7-3576 (see claim 1 of the publication)

Patent Document 2: Japanese Patent Application Publication No. 2004-346959 (see the abstract of the publication)

Figure 4:
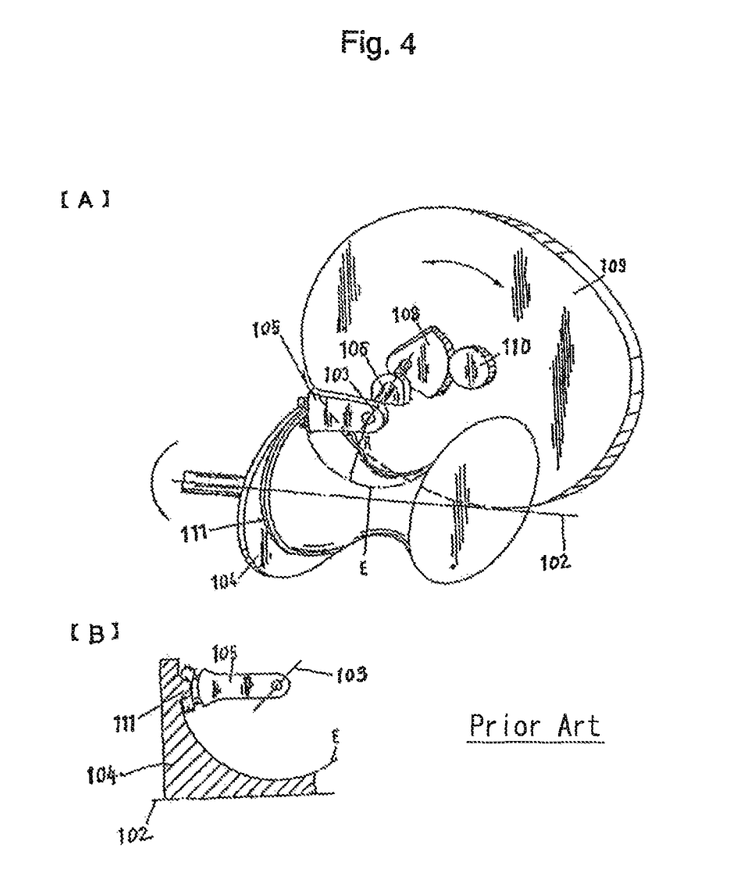
FIG. 4 is an explanatory diagram of a gripper belt driving apparatus of the first conventional example.

The invention disclosed in Patent Document 1 is provided with, as shown in FIG. 4, a cam main body 104 performing a rotational movement and a follower 105 engaged with the cam main body 104 and performing a swinging movement, wherein: the rotational movement is translated into the swinging movement; the cam main body 104 is provided with a guide surface 111 formed with a closed curve and formed such that an external shape E of this region constitutes an arc line; the follower 105 is engaged with the guide surface 111; and the rotation axis center is nonrotatably connected to a shaft 106 passing through the center of the external shape E.

Figure 5:
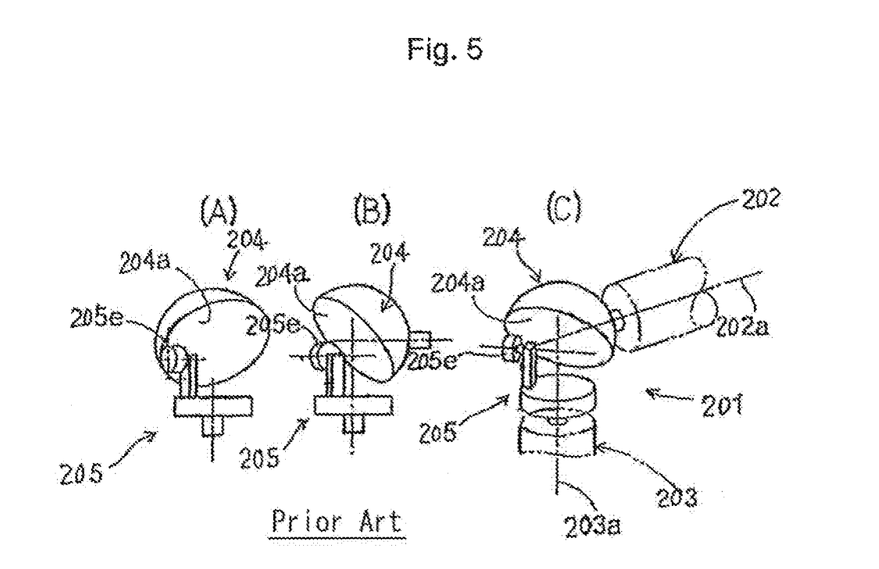
FIG. 5 is an explanatory diagram of a cam type power transmission mechanism of the second conventional example.

In the invention disclosed in Patent Document 2 has, as shown in FIG. 5, a cam type power transmission mechanism 201, which transmits a rotation power between first and second rotating shafts 202, 203 arranged so that rotation center lines 202a, 203a thereof cross each other at a predetermined angle, has a cam 204 attached to the first rotating shaft 202 and a cam follower 205 attached to the second rotating shaft 203, wherein in the cam 204, a cut face obtained by cutting a spherical body in a curved face or a flat face is formed as a cam face 204a, and the first rotation center line 202a is connected to the first rotating shaft 202 so as to pass the center of the spherical body, and the cam follower 205 has a roller 205e attached to the second rotating shaft 203 so as to draw a circular track with a predetermined radius around the rotation center line 203a of the second rotating shaft 203. When one rotating shaft is rotated, the roller 205e of the cam follower 205 relatively slides along the cam face 204a of the cam 204 to finitely rotate the other rotating shafts.

In the invention of Patent Document 1 shown in FIG. 4 among these prior arts, because the external shape E of the surface region of the cam main body 104 constitutes an arc line and the shaft 106 of the follower 105 passes through the center of the external shape E, a follower joint can perform only a rotational movement (reciprocal movement) around an axis line 103 twisted at a right angle to the axial line 102 of the cam main body 104. Moreover, although the rotation of the cam main body 104 can be translated smoothly into the swinging movement of the follower 105 by means of the three-dimensional cam, transmission of the power from the shaft 106 of the follower 105 to a synchronous pulley 109 needs to be performed through a sector gear 108 and a pinion 110, unlike a structure configured only by the follower 105, and therefore the occurrence of backlash in a gear meshing part cannot be prevented, still lowering the conversion accuracy. Further, in these conventional examples, although it is possible to reversely transmit the power from the follower 105, smooth operations cannot be expected.

In the invention of Patent Document 2 shown in FIG. 5, the cam surface 204a of the three-dimensional cam 204 that determines the operation on the follower side having the cam follower 205 is generated by cutting the spherical body in the curved face or the flat face, and, unlike the gear type or wire type articulating mechanism, it is not necessary to increase backlash or provide a tension adjusting mechanism and a wire turning mechanism. Also, reduction in the number of parts and lowering of the control characteristics due to stretching and interference of the wire no longer occur. However, because the cam surface 204a is generated by cutting the spherical body in the curved face or the flat face, the behavior on the cam follower 205 side, i.e., the follower side, is limited, and guiding is performed by the cam surface 204a and the roller 205e of the cam follower 205 at only one point, whereby the transmission of the power by the cam mechanism tends to become unstable.

DISCLOSURE OF THE INVENTION

Therefore, an object of the present invention is to solve the problems of the conventional three-dimensional cam mechanisms, and to provide a three-dimensional cam mechanism, which is capable of selecting a cam guide surface shape freely to drastically improve the degree of freedom for selecting a target locus on the follower side, transmitting not only a power between orthogonal axes but also a strong and reliable power, and performing a reversible operation.

In order to achieve the object described above, a means of a technical solution employed by the present invention is a three-dimensional cam mechanism, including: a three-dimensional cam configured to be pivotally supported to a supporting member to be rotatable about a predetermined rotation axis and to have a cam guide face; and a follower side link pivotally supported to another portion of the supporting member to be guided along the cam guide surface, wherein the cam guide face is shaped into a three-dimensional configuration, the follower side link being formed at its one end with a cam follower which extends at a predetermined angle with respect to the follower side link to be guided along the cam guide surface for translating a rotational movement of the three-dimensional cam into a swinging movement at the other end of the follower side link.

The present invention is also characterized in that the three-dimensional cam and the follower side link are configured to translate the swinging movement of the follower side link into the rotational movement of the three-dimensional cam.

Furthermore, the present invention is characterized in that the three-dimensional cam has at least one pair of the cam guide surfaces which are independent from each other with a predetermined interval therebetween, and the follower side link has one pair of the cam followers respectively in association with the cam guide surfaces.

The present invention is further characterized in that a guide roller is pivotally supported to the cam follower of the follower side link to be guided along the cam guide surface of the three-dimensional cam.

In addition, the present invention is characterized in that one of the cam follower and the follower side link is provided with biasing means which urges the cam follower or the guide roller of the follower side link against the cam guide surface of the three-dimensional cam. The present invention is also characterized in that the supporting member is divided into an upper part and a lower part which are rotatable relative to each other.

BEST MODE FOR CARRYING OUT THE INVENTION

Figure 1:
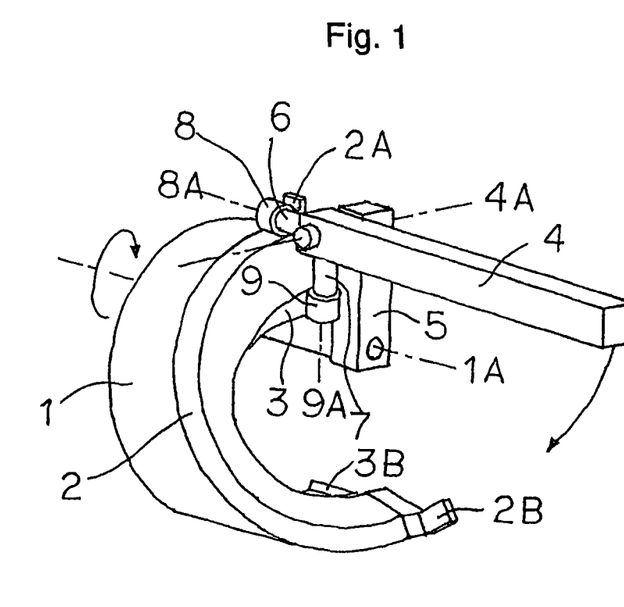
FIG. 1 is an overall perspective view illustrating the principle of a first embodiment of a three-dimensional cam mechanism according to the present invention.
Figure 2:
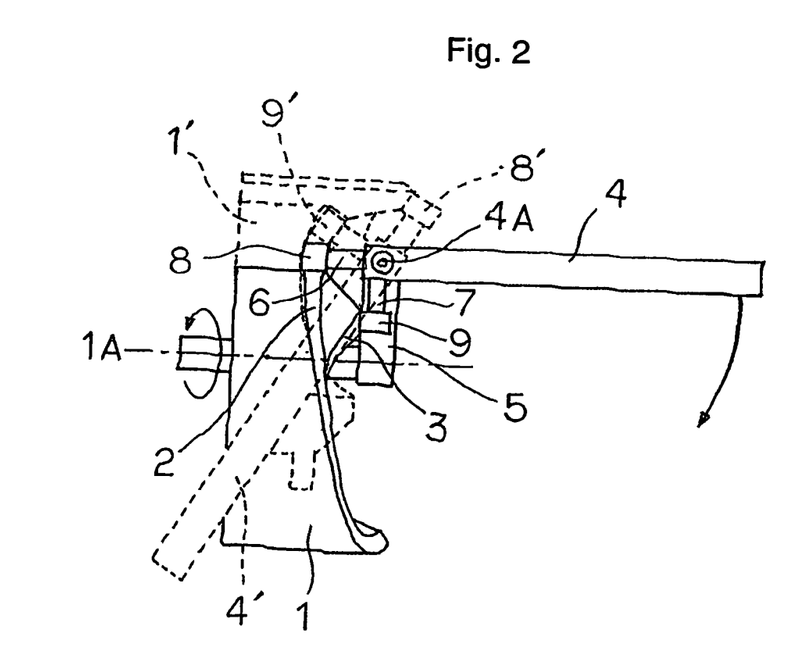
FIG. 2 is a front elevational view showing a cam operation performed by the three-dimensional cam mechanism of the present invention.
Figure 3:
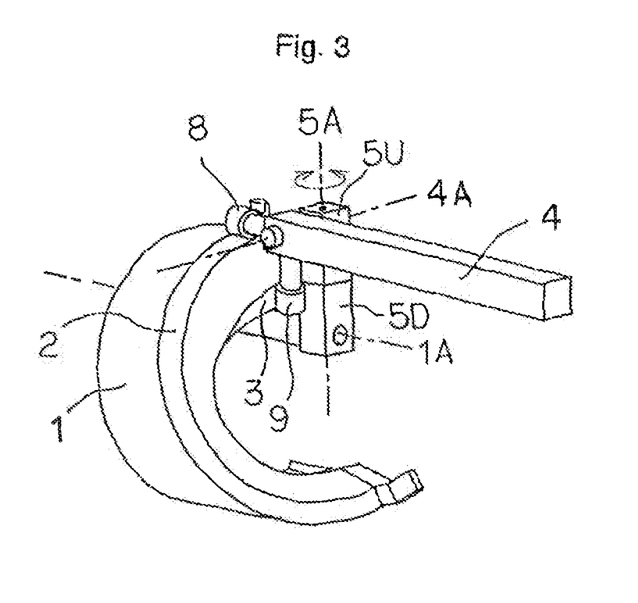
FIG. 3 is an overall perspective view showing a second embodiment of the three-dimensional cam mechanism according to the present invention.

Hereinafter, best mode for carrying out the three-dimensional cam mechanism according to the present invention is described with reference to the drawings. FIG. 1 is an overall perspective view illustrating the principle of a first embodiment of a three-dimensional cam mechanism according to the present invention. FIG. 2 is a front elevational view showing a cam operation performed by the three-dimensional cam mechanism of the present invention. FIG. 3 is an overall perspective view showing a second embodiment of the three-dimensional cam mechanism according to the present invention.

Embodiment 1 is now described.

The basic configuration of the three-dimensional cam mechanism of the present invention is characterized in that, in a three-dimensional cam mechanism, which is configured such that a follower side link 4 pivotally supported to a part of a supporting member 5 is guided to a cam guide surface 2 of a three-dimensional cam 1 pivotally supported to the supporting member 5 and rotating about a predetermined rotation axis 1A, as shown in the first embodiment in FIG. 1, a three-dimensional cam guide surface 2 (3) is formed in the three-dimensional cam 1, and a cam follower 6 (7) formed at a predetermined angle at one end of the follower side link 4 is guided to the cam guide surface 2, to translate a rotational movement of the three-dimensional cam 1 into a swinging movement of the other end of the follower side link 4.

In the embodiment shown in FIG. 1, a three-dimensional cam mechanism in which a three-dimensional cam joint realizing a robot arm or a target trajectory of a finger is configured is structured as follows. Note that FIG. 1 shows the embodiment in which a pair of the cam guide surfaces 2, 3 of the three-dimensional cam 1 and a pair of the cam followers 6, 7 or guide rollers 8, 9 of the follower side link 4 corresponding thereto are disposed. However, although not shown, basically in the present invention one of the cam followers 6 (7) may be formed in the follower side link 4, or means for pivotally supporting the guide roller 8 (9) to the cam follower 6 (7) of the follower side link 4 and biasing the guide roller 8 (9) to the cam guiding surface 2 (3) of the three-dimensional cam 1 may be effectively disposed, to obtain the cam guide surface and one of the cam follower and the guide roller. Hereinafter, an embodiment in which one pair of the cam guide surfaces 2, 3 and one pair of the cam followers 6, 7 or guide rollers 8, 9 are disposed is explained. Three of the cam guide surfaces and the cam followers or guide rollers may be disposed.

The three-dimensional cam 1 is pivotally supported to the vertical supporting member 5 so as to be rotatable around the predetermined cam rotation axis 1A (disposed substantially horizontally in the illustrated example). One pair of the independent three-dimensional cam guide surfaces 2, 3 is formed in the three-dimensional cam 1. In the illustrated example, the cam guide surfaces 2, 3 are provided such that the radius of the three-dimensional cam 1 increases gradually as it continues to rotate from the illustrated condition. In addition to the increase of the radius, the height of a rotation axis direction of the cam may be changed. Generally, the profiles of the height and radius change in accordance with the design of the swing angles of the cam followers. Each of the cam guide surfaces 2, 3 is formed with an independent guide surface three-dimensionally, and the guide rollers 8, 9 that are pivotally supported respectively to the pair of cam followers 6, 7 formed at a predetermined angle (substantially orthogonally in the illustrated example) at one end of the follower side link 4 are guided and caused to travel. As a result, the follower side link 4 swings about a follower joint rotation axis 4A that is substantially orthogonal to the cam rotation axis 1A at an upper part of the supporting member 5 (the follower joint rotation axis 4A can be disposed not at a right angle but at any intersection angle by selecting the shape of the supporting member 5 and the shape of the cam guide surfaces 2, 3). The other end part of the follower side link 4 constitutes a target trajectory of a robot arm or a finger, as shown by the arrow.

Generation of one pair of the three-dimensional independent cam guide surfaces 2, 3 of the three-dimensional cam 1 is designed such that the behavior of the other end part of the follower side link 4 becomes the target trajectory of a robot arm or a finger. By setting the shape of the cam guide surfaces 2, 3, the angle between the cam followers 6, 7 (the angle that is configured by the cam followers 6 and 7 so as to match the angle of the cam followers 6, 7 with respect to the follower side link 4 and the angle formed by the cam guide surfaces 2, 3 so as to match the shape of the cam guide surfaces 2, 3) can be set appropriately, and the regular rotation of the three-dimensional cam 1 can be translated into the irregular swinging movement of the follower side link 4. Furthermore, biasing means is provided in order to push the pair of guide rollers 8, 9 of the follower side link 4 to the cam guide surfaces 2, 3 of the three-dimensional cam 1 respectively.

For example, a spring may be stretched tightly between the pair of cam followers 6, 7, or each of the cam followers 6, 7 may be biased by a coil spring or the like to the cam guide surfaces 2, 3 side with respect to the follower side link 4. In this manner, a reliable contact guide function can be exerted between the three-dimensional cam 1 and the follower side 4, further improving the transmission accuracy.

The follower joint rotation axis 4A of the supporting member 5 is fixed to, for example, an external cover that is not shown, but it may not necessarily be a fixing part, depending on equipment to be applied. Thus, the cam rotation axis 1A of the three-dimensional cam 1 can swing around the follower joint rotation axis 4A, from the illustrated horizontal state. In other words, the cam rotation axis 1A can rotate the three-dimensional cam 1 while swinging around the follower joint rotation axis 4A by taking the length of a vertical direction of the supporting member 5 as an arm.

FIG. 2 is a front elevational view showing a cam operation performed by the three-dimensional cam mechanism of the present invention. The solid lines show the condition shown in FIG. 1. The guide rollers 8, 9 that are pivotally supported respectively to the pair of cam followers 6, 7 formed at a predetermined angle at one end of the follower side link 4 are guided and caused to travel to the cam guide surfaces 2, 3 of the three-dimensional cam 1. By rotating the three-dimensional cam 1 around the cam rotation axis 1A, the radius of each of the cam guide surfaces 2, 3 stretched from the cam rotation axis 1A increases gradually. As described above, in addition to the increase of the radius, the height of a rotation axis direction of the cam may be changed.

The profiles of the height and radius change in accordance with the design of the swing angles of the cam followers. The follower side link 4 swings around the follower joint rotation axis 4A as shown by the arrow. The dashed lines show the positions of the cam guide surfaces 2, 3 that are obtained by rotating the three-dimensional cam 1 180 degrees, as well as the positions of guide rollers 8', 9' guided by the cam guide surfaces 2, 3 and a follower side link 4'.

Stoppers 2A, 2B are installed in a start end part of each cam guide surface 2, 3 and stoppers 3A (not shown), 3B are installed in a tail end part of the same, to prevent the guide rollers 8, 9 to be separated from the three-dimensional cam 1. The present invention can be designed such that the follower side link 4 can be caused to swing upward by reversely rotating the three-dimensional cam 1. The cam guide surfaces 2, 3 can be designed easily so that a reversal operation where the three-dimensional cam 1 is rotated by swinging the follower side link 4 can be performed. Note that the shape of the cam guide surfaces 2, 3 capable of performing the reversal operation can be realized by allowing a torque, which is generated when the guide rollers 8, 9 press the cam guide surfaces 2, 3, to exceed the magnitude of a torque required for rotating the three-dimensional cam 1.

Embodiment 2 is now described.

FIG. 3 is an overall perspective view showing a second embodiment of the three-dimensional cam mechanism according to the present invention. In the present embodiment, a lower part rotatably and pivotally supports the three-dimensional cam 1 by means of the cam rotation axis 1A, while an upper part divides the supporting member 5 swingably and pivotally supporting the follower side link 4 by means of the follower joint rotation axis 4A into an upper part and a lower part, and the upper supporting member 5U and the lower supporting member 5D are relatively rotatable to each other by means of a supporting part rotation axis 5A. By appropriately selecting the three-dimensional shape of each cam guide surfaces 2, 3 of the three-dimensional cam 1, the abovementioned configuration can allow the follower side link 4 to swing by swinging the cam rotation axis 1A around the follower joint rotation axis 4A by taking the length of the vertical direction of the supporting member 5 as an arm, as well as by rotating the three-dimensional cam 1 while changing the intersection angle of the cam rotation axis 1A with respect to the follower joint rotation axis 4A on a planar view.

The above has described the embodiments of the present invention, and the shape of the supporting member (the degree of a twist for determining the intersection angle or the like between the cam rotation axis and the follower joint rotation axis. There is no twist when the intersection angle is orthogonal as shown in the diagram. When the supporting member is divided into the upper part and the lower part, a predetermined twist angle may be obtained so as to realize a relative rotation mode, such as a configuration where the upper part and the lower part can freely rotatable relative to each other and be fixed freely at every predetermined angle), the form of the supporting member, the pivotal support mode of the cam rotation axis and the follower joint rotation axis in the supporting member (the pivotal support mode where a bearing or a metal is used), the shape and form of the three-dimensional cam, the shape of the cam guide surfaces (a three-dimensional and independent appropriate shape is employed, but the width, interval, surface processing mode and the like of the pair of cam guide surfaces can be selected appropriately), the shape of the follower side link (in the illustrated example, it is in the shape of a straight rod like body, but the cross-sectional shape can be freely selected, and an arm shape or various other shapes can be employed by freely), the form of the follower side link, the installation mode of the cam followers in the follower side link, the angle formed by the pair of cam followers, the pivotal support mode of the guide roller with respect to the cam follower (the pivotal support mode where a bearing or a metal is used), the shape of the biasing means for biasing the cam followers or the guide rollers of the follower side link to the cam guide surfaces, and the form of the biasing means (plate spring, coil spring or the like) can be selected appropriately. Furthermore, the data described in the embodiments are merely examples in all respects and therefore should not be interpreted in a limited way.

INDUSTRIAL APPLICABILITY

According to the present invention, in a three-dimensional cam mechanism, which is configured such that a follower side link pivotally supported to a part of a supporting member is guided to a cam guide surface of a three-dimensional cam pivotally supported to the supporting member and rotating about a predetermined rotation axis, a three-dimensional cam guide surface is formed in the three-dimensional cam, and a cam follower formed at a predetermined angle at one end of the follower side link is guided to the cam guide surface, to translate a rotational movement of the three-dimensional cam into a swinging movement at the other end of the follower side link. As a result, the cam guide surface shape can be selected freely to drastically improve the degree of freedom for selecting the target locus on the follower side, and smooth operations of the three-dimensional cam can be obtained not only by the selection of the shape of the supporting member but also by the free design of the cam guide surface shape, without being neither limited to the power transmission between the orthogonal axes nor followed by the backlash. Moreover, in the case of a configuration where the swinging movement of the follower side link can be translated into the rotational movement of the three-dimensional cam, a reversible operation of the three-dimensional cam where the follower side is a driving joint can be obtained easily.

Further, when the three-dimensional cam has at least one pair of the cam guide surfaces which are independent from each other with a predetermined interval therebetween, and the follower side link has one pair of the cam followers respectively in association with the cam guide surfaces, a strong and reliable power can be transmitted by at least the pair of cam followers that are guided to at least the pair of cam guide surfaces respectively. In addition, in the case of a configuration where the guide rollers are pivotally supported to the cam followers of the follower side link and guided to the cam guide surfaces of the three-dimensional cam, guiding is performed smoothly by the rotation of the guide rollers, and not only the reversal operation but also the operation of the three-dimensional cam can be performed smoothly.

When the biasing means for biasing the cam follower or the guide roller of the follower side link against the cam guide surface of the three-dimensional cam is installed in the cam follower or the follower side link, the secure contact guide function is exerted between the three-dimensional cam and the follower side so that a shaky movement is prevented, further improving the transmission accuracy. When the supporting member is divided into an upper part and a lower part which are rotatable relative to each other, the angular relationship between the rotation axis of the three-dimensional cam and a swinging axis of the follower side can be selected freely.

The invention claimed is:

1. A three-dimensional cam mechanism comprising:
a supporting member;
a three-dimensional cam configured to be pivotally supported to the supporting member so as to be rotatable about a predetermined cam rotation axis, said three-dimensional cam having a cam guide face; and
a follower side link pivotally supported to an another portion of said supporting member to be guided along said cam guide face,
wherein said three-dimensional cam comprises at least a pair of said cam guide faces which are independent from each other, said cam guide faces are shaped into a three-dimensional configuration, one of said cam guide faces having three dimensional configuration is spaced from the other of said cam guide faces having three dimensional configuration by a predetermined distance,
said follower side link being formed at its one end with at least a pair of cam followers, each said cam follower extends at a predetermined angle with respect to said follower side link to be guided along said cam guide face,
said cam followers correspond to said cam guide faces, respectively,
each one of three dimensional curved faces of said cam guide faces are set such that a portion in a circumferential direction of the cam guide face in contact with said cam follower is caused to successively vary its radius from said cam rotation axis and also its height with respect to the cam rotation axis while the three-dimensional cam rotates, thereby translating a rotational movement of said three-dimensional cam into a swinging movement at the other end of said follower side link, and also translating the swinging movement of said follower side link into the rotational movement of said three dimensional cam, and
wherein said three-dimensional cam has a C-shape, said three-dimensional cam has a C-shaped surface having first and second ends, a direction of said C-shaped surface gradually changes between said first and said second ends,
said at least the pair of said cam guide faces having a first cam guide face and a second cam guide face, said first and second cam guide faces being provided along both sides of said C-shaped surface between said first and said second ends, respectively,
facing direction of said first cam guide face gradually changes from said first end to said second end: from a direction crossing with said cam rotation axis; and through an axial direction of said cam rotation axis, and
facing direction of said second cam guide face gradually changes from said first end to said second end: from an axial direction of said cam rotation axis; and through a direction crossing with said cam rotation axis.

2. The three-dimensional cam mechanism as set forth in claim 1, wherein a guide roller is pivotally supported to said cam follower to be guided along said cam guide surface of the three-dimensional cam.

3. The three-dimensional cam mechanism as set forth in claim 2, wherein one of said cam follower and said follower side link is provided with a biasing means which urges said cam follower or said guide roller against said cam guide surface of said three-dimensional cam.

4. The three-dimensional cam mechanism as set forth in claim 3, wherein said supporting member is divided into an upper part and a lower part which are rotatable relative to each other.

5. The three-dimensional cam mechanism as set forth in claim 2, wherein said supporting member is divided into an upper part and a lower part which are rotatable relative to each other.

6. The three-dimensional cam mechanism as set forth in claim 1, wherein one of said cam follower and said follower side link is provided with a biasing means which urges said cam follower or said guide roller against said cam guide surface of said three-dimensional cam.

7. The three-dimensional cam mechanism as set forth in claim 6, wherein said supporting member is divided into an upper part and a lower part which are rotatable relative to each other.

8. The three-dimensional cam mechanism as set forth in claim 1, wherein said supporting member is divided into an upper part and a lower part which are rotatable relative to each other.

9. The three-dimensional cam mechanism as set forth in claim 1, wherein
said three-dimensional cam is pivotally supported to one end of the supporting member, and said follower side link is pivotally supported to the other end of the supporting member.

10. The three-dimensional cam mechanism as set forth in claim 1, wherein
said three-dimensional cam has the C-shape such that each the cam guide surface has a C-shape, and
said cam followers being configured to contact with predetermined portions of said cam guide surfaces such that a distance between the cam rotation axis and each the predetermined portion gradually varies and a height between the cam rotation axis and each the predetermined portion gradually varies.

11. The three-dimensional cam mechanism as set forth in claim 1, further comprises a follower joint rotation axis,
said follower side link being pivotally supported to the another portion of said supporting member through said follower joint rotation axis,
wherein an axial direction of the cam rotation axis is different from an axial direction of the follower joint rotation axis.

12. The three-dimensional cam mechanism as set forth in claim 11, wherein
said supporting member has a width direction and a depth direction,
said cam rotation axis extending in the width direction of the supporting member,
said follower side link extending in the depth direction of the supporting member.

13. The three-dimensional cam mechanism as set forth in claim 11, wherein
said supporting member has a rod shape, whereby the supporting member has a width direction, a depth direction, and a height direction,
said cam rotation axis extending in the width direction of said supporting member,
said follower side link extending in the depth direction of the supporting member.

14. The three dimensional cam mechanism as set forth in claim 11, wherein
said three-dimensional cam has the C-shape to make an open-space between ends of the three-dimensional cam,
said follower side link being pivotally supported to the follower joint rotation axis to be movable between a first position and a second position through a predetermined pivot locus,
said three-dimensional cam being supported to said cam rotation axis to be movable between a first rotation position and a second rotation position,
wherein when said three-dimensional cam is in the first rotation position, the three-dimensional cam crosses the predetermined pivot locus,
wherein when said three-dimensional cam is moved from the first rotation position to the second rotation position, the follower side link is moved from the first position to the second position through the open space.

15. The three dimensional cam mechanism as set forth in claim 1, wherein
said three-dimensional cam is formed in the C-shape, thereby defining a space surrounded by said C-shaped three-dimensional cam, and
said three-dimensional cam is formed so that said the other end of said follower side link swings toward said space when said cam followers moves from said first end toward said second end.

* * * * *